(12) United States Patent
Smith et al.

(10) Patent No.: US 6,448,929 B1
(45) Date of Patent: Sep. 10, 2002

(54) METHOD AND APPARATUS FOR CORRELATING FLIGHT IDENTIFICATION DATA WITH SECONDARY SURVEILLANCE RADAR DATA

(75) Inventors: Alexander E. Smith, McLean; Bennett Cohen, Alexandria, both of VA (US); Carl Evers, Rockville, MD (US)

(73) Assignee: Rannoch Corporation, Alexandria, VA (US)

( * ) Notice: Subject to any disclaimer, the term of this patent is extended or adjusted under 35 U.S.C. 154(b) by 0 days.

(21) Appl. No.: 09/953,560

(22) Filed: Sep. 17, 2001

Related U.S. Application Data

(62) Division of application No. 09/466,127, filed on Dec. 21, 1999, which is a continuation-in-part of application No. 09/432,757, filed on Nov. 3, 1999, now Pat. No. 6,211,811, which is a division of application No. 09/114,921, filed on Jul. 14, 1998, now Pat. No. 5,999,116.
(60) Provisional application No. 60/113,169, filed on Dec. 21, 1998.

(51) Int. Cl.$^7$ ................................................. G01S 13/00
(52) U.S. Cl. ........................... 342/456; 342/37; 342/32
(58) Field of Search ........................... 342/32, 37, 387, 342/454, 455, 456; 701/120, 200

(56) References Cited

U.S. PATENT DOCUMENTS

| | | |
|---|---|---|
| 3,705,404 A | 12/1972 | Chisolm |
| 4,196,474 A | 4/1980 | Buchanan et al. |
| 4,229,737 A | 10/1980 | Heldwein et al. |
| 4,454,510 A | 6/1984 | Crow |
| 4,524,931 A | 6/1985 | Nilsson |
| 4,688,046 A | 8/1987 | Schwab |
| 4,782,450 A | 11/1988 | Flax |
| 5,144,315 A | 9/1992 | Schwab |
| 5,191,342 A | 3/1993 | Alsup et al. |
| 5,262,784 A | 11/1993 | Drobnicki et al. |
| 5,365,516 A | 11/1994 | Jandrell |
| 5,374,932 A | 12/1994 | Wyschogrod et al. |

(List continued on next page.)

FOREIGN PATENT DOCUMENTS

| | | |
|---|---|---|
| JP | 6-342061 A | 12/1994 |
| JP | 8-146130 A | 5/1996 |
| JP | 9-119983 A | 11/1996 |
| JP | 9-288175 A | 11/1997 |

OTHER PUBLICATIONS

Traffic Alert System Technical Design Summary, Final Report, Apr. 1994 (Baldwin et al.).

Airscene, The complete Air Traffic Picture in Real Time, www.airscene.com, Rannoch Corporation, Alexandria, Virginia, undated.

GPS Relative Accuracy for Collision Avoidance, Institute of Navigation Technical Meeting, Jan. 1997 (Rudel et al.).

*Primary Examiner*—Dao Phan
(74) *Attorney, Agent, or Firm*—Robert Platt Bell

(57) ABSTRACT

A system for correlating secondary surveillance radar (SSR) data and ACARS data which results in a real time correlation of data which are unique to the separate existing systems. More specifically, a method is provided to attach flight identification data from ACARS signals to real time SSR data from Mode S transponders. Aircraft Mode S addresses are decoded and then converted to aircraft registration numbers using an algorithm or lookup table. Registration numbers are then correlated with registration numbers from decoded ACARS signals. The result is a real-time system which may provide an aircraft's registration information, including registration number, owner, make, and model, as well as its current flight identification number, and ACARS messages. As part of an aircraft multilateration system, the system provides an independent air traffic control picture complete with aircraft position and identification by flight number without the use of active radar equipment.

11 Claims, 4 Drawing Sheets

U.S. PATENT DOCUMENTS

| | | |
|---|---|---|
| 5,402,116 A | 3/1995 | Ashley |
| 5,528,244 A | 6/1996 | Schwab |
| 5,570,095 A | 10/1996 | Drouilhet, Jr. et al. |
| 5,596,326 A | 1/1997 | Fitts |
| 5,596,332 A | 1/1997 | Coles et al. |
| 5,627,546 A | 5/1997 | Crow |
| 5,680,140 A | 10/1997 | Loomis |
| 5,714,948 A | 2/1998 | Farmakis et al. |
| 5,774,829 A | 6/1998 | Cisneros et al. |
| 5,781,150 A | 7/1998 | Norris |
| 5,867,804 A | 2/1999 | Pilley et al. |
| 5,999,116 A | 12/1999 | Evers |
| 6,049,304 A | 4/2000 | Rudel et al. |
| 6,085,150 A | 7/2000 | Henry et al. |
| 6,094,169 A | 7/2000 | Smith et al. |
| 6,211,811 B1 | 4/2001 | Evers |

METHOD AND APPARATUS FOR CORRELATING FLIGHT IDENTIFICATION DATA WITH SECONDARY SURVEILLANCE RADAR DATA

CROSS-REFERENCE TO RELATED APPLICATIONS

The present application claims priority from Provisional U.S. Patent Application Ser. No. 60/113,169, filed Dec. 21, 1998, entitled "METHOD AND APPARATUS FOR CORRELATING FLIGHT IDENTIFICATION DATA WITH SECONDARY SURVEILLANCE RADAR DATA" and incorporated herein by reference.

The present application is a Divisional Application of U.S. patent application Ser. No. 09/466,127, filed on Dec. 21, 1999, entitled "METHOD AND APPARATUS FOR CORRELATING FLIGHT IDENTIFICATION DATA WITH SECONDARY SURVEILLANCE RADAR DATA", incorporated herein by reference.

The present application is a Continuation-In-Part (CIP) of application Ser. No. 09/432,757, filed Nov. 3, 1999, now U.S. Pat. No. 6,211,811, which in turn is a Divisional Application of Ser. No. 09/114,921, filed Jul. 14, 1998, now U.S. Pat. No. 5,999,116.

The subject matter of this application is related to co-pending U.S. patent application Ser. No. 08/891,227, filed Jul. 10, 1997, entitled "METHOD AND APPARATUS FOR IMPROVING THE ACCURACY OF RELATIVE POSITION ESTIMATES IN A SATELLITE-BASED NAVIGATION SYSTEM" and co-pending U.S. patent application Ser. No. 09/114,921, filed Jul. 14, 1998, entitled "Method and Apparatus for Improving the Surveillance Coverage and Target Identification in a Radar Based Surveillance System", and Ser. No. 09/209,008, filed Dec. 11, 1998, entitled "Passive Multilateration Auto-Calibration and Position Error Correction", all of which are incorporated herein by reference.

FIELD OF THE INVENTION

The present invention relates to the field of aircraft tracking and identification. The present invention is specifically directed toward a technique for passively retrieving and correlating aircraft data from existing aircraft data sources.

BACKGROUND OF THE INVENTION

The Federal Aviation Administration (FAA) requires all passenger carrying aircraft over 30 seats be equipped with so-called "Mode S" transponders. Mode S transponders are capable of transmitting a number (e.g., 25) of formats of coded data. This coded data includes such information as a unique 24-bit binary address for each aircraft.

The aircraft registration number may be derived from this 24-bit binary address. The coded Mode-S data also includes such information as aircraft altitude and is transmitted continuously throughout a flight at a minimum rate of 1 Hz (i.e., once per second). Coded Mode-S data may be collected passively without any connection to air traffic control equipment.

The FAA has endorsed the Aircraft Communications Addressing and Reporting System (ACARS) system, which uses various data link technologies including the VHF communication band, HF and SATCOM along with a ground station network to allow aircraft to transmit and receive messages of coded data. Many domestic and international carriers have equipped their aircraft with ACARS equipment.

ACARS equipment is capable of transmitting a number of types of coded data. ACARS currently uses frequency shift keying (FSK) as a modulation scheme, however, other modulation schemes including minimum shift keying (MSK) and time division multiple access (TDMA) are being evaluated for future improvement of ACARS. ACARS data includes such information as the aircraft registration number and airline flight identification number (flight number).

ACARS transmissions from a single aircraft may be sent at varying intervals from as little as no transmissions in a single flight to several transmissions per minute. ACARS transmissions may be collected passively without any connection to air traffic control equipment.

None of the currently used or planned Mode S downlink formats provides for the transmission of flight identification data. There are a number of methods including Automatic Dependent Surveillance—Broadcast (ADS-B) and multilateration which allow for the precise determination of aircraft location through the Mode S downlink formats on a frequent basis. ACARS transmissions, while capable of encoding aircraft position and altitude, are not typically used for position determination as the frequency of ACARS transmissions is too .infrequent to allow one to accurately and timely determine the exact position of an aircraft.

SUMMARY OF THE INVENTION

The present invention includes hardware, software, and a methodology for correlating flight identification data with aircraft registration numbers. In a first embodiment featuring a 1090 MHz receiver, Mode S decoder, ACARS receiver, and ACARS decoder, aircraft registration numbers and other Mode S data are correlated with the current flight identification of an aircraft as well as other data provided from ACARS messages.

The present invention provides for linking (correlation) of flight identification data from ACARS messages with the data from Mode S transponder transmissions, which are more frequent and provide for real time position and altitude determination. The effect of which is to provide the same data as an air traffic controller would see on his or her screen without the need for active interrogation or connection to any Air Traffic Control equipment.

DETAILED DESCRIPTION OF THE INVENTION

The present invention is now described with reference to the figures where like reference numbers denote like elements or steps in the process.

Figure 1:
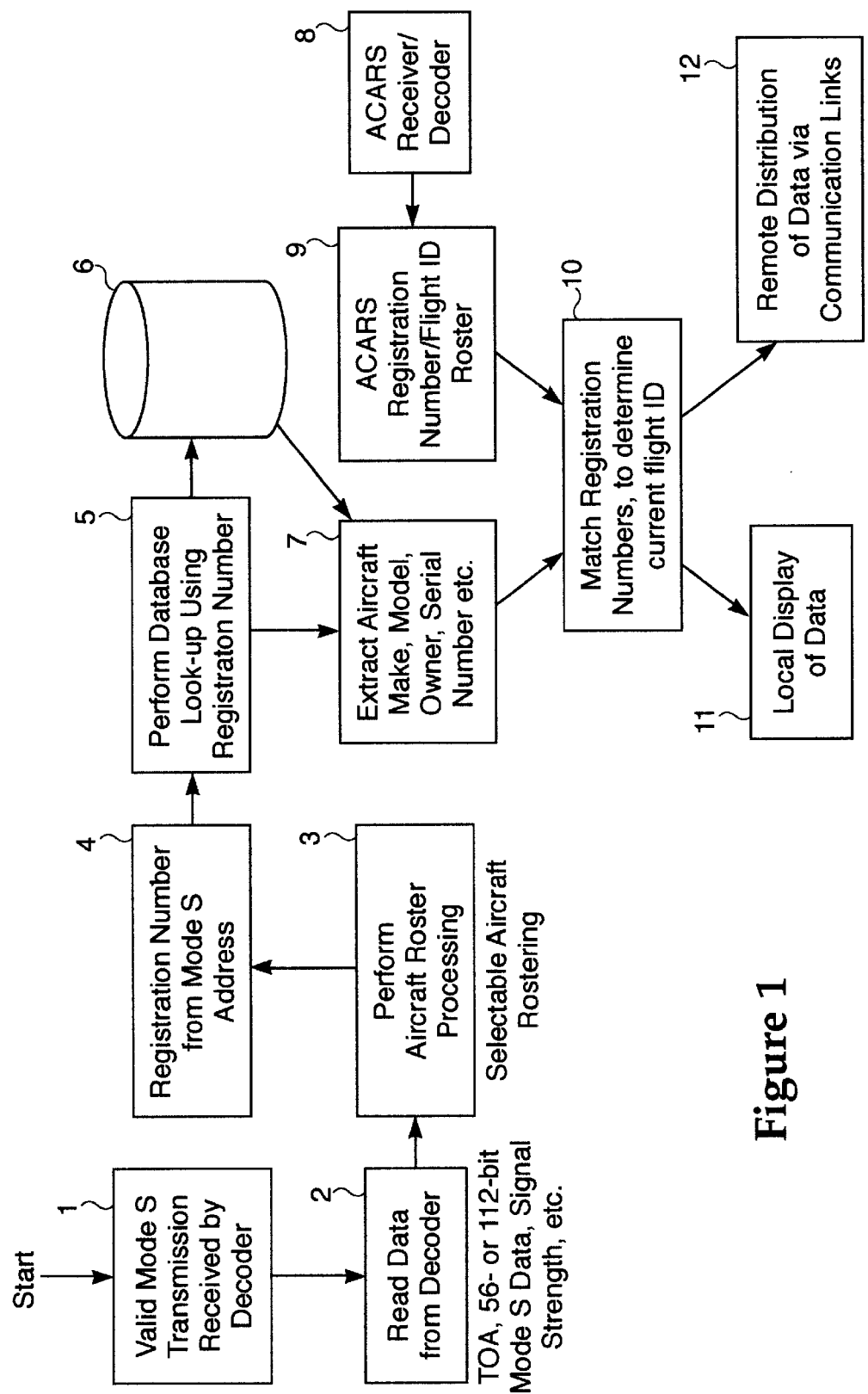
FIG. 1 is a flow chart of a process for decoding secondary surveillance radar transmissions, decoding ACARS transmissions, and correlating flight identifications from ACARS with registration details from both SSR and ACARS.

Referring to FIG. 1, 1090 MHz, Mode S transponder signals are received by a receiver/decoder in step 1. In step 1, the received analog Mode S signal is converted to digital data. In step 2, the Mode S address is extracted from the digital data. The Mode S address is then stored in a roster in step 3 and used to generate the aircraft registration or "N" number which is extracted in step 4. U.S. aircraft registration numbers may be determined directly by an algorithm, while foreign aircraft registrations may be determined by a lookup table.

The aircraft registration number from step 4 may then be used to perform a database look-up in step 5. Step 5 utilizes a database 6 which may contain details of aircraft make, model, serial number, owner/operator, owner/operator address, engine type, engine noise class, engine modifications and any other pertinent data associated with a particular aircraft. Such data is extracted in step 7.

Simultaneously or concurrently with Mode-S decoding, a receiver/decoder capable of receiving and decoding ACARS signals receives and decodes such signals as illustrated in step 8. ACARS transmission may occur over VHF frequencies such as 131.550 MHz, 130.025 MHz, 129.125 MHz, 131.725 MHz, 131.450 MHz, 131.550 MHz, and 131.475 MHz, and/or HF and/or SATCOM and/or any other data link method and/or any other modulation scheme, including VDL Mode 1, 2, 3 or 4.

Aircraft registration number and flight ID number, as well as other ACARS message details, including but not limited to, "Out, Off, On and In" reports, cockpit message reports, fuel reports, peripheral message reports and miscellaneous message reports are then stored in a roster in step 9. Data from step 9 may then be matched with data from step 7. In step 10, aircraft registration numbers from steps 7 and 9 are matched to determine flight identification number.

The flight identification number is thereby associated with the corresponding aircraft registration number as a result of step 10. If there is no correlation between registration numbers from steps 7 and 10, the data may also be stored. The resultant information from steps 7, 9, and 10 may then be displayed locally over a display terminal in step 11 and/or distributed to remote locations via communication links as illustrated in step 12.

Figure 2:
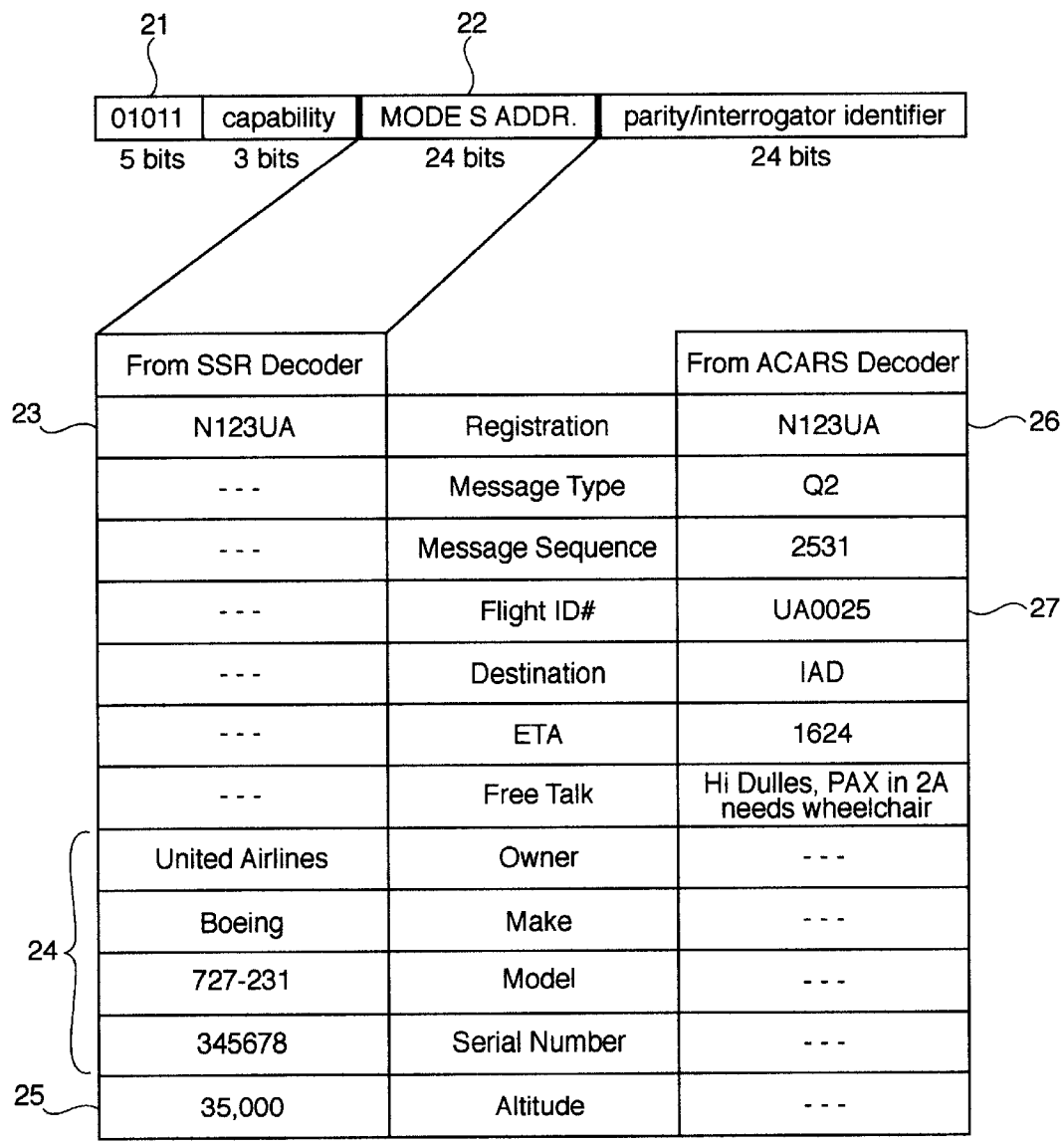
FIG. 2 is a diagram of DF-11 Mode S transponder transmission data and ACARS data, indicating the position of the Mode S address from within a Mode S transmission and illustrating the association between the Mode S address and derived registration data.

Referring to FIG. 2, a DF-11 Mode S transponder transmission 21 is received and aircraft Mode S address 22 is extracted. Mode S address 22 is either converted to a U.S. aircraft registration number 23 through an algorithm or determined to be a non-U.S. registered aircraft whose registration can be looked-up from a database. Data 24 associated with a particular registration number, such as aircraft owner, make, model, and serial number may then be looked-up from a database. Aircraft altitude 25 may be decoded from other Mode S transponder signals which include altitude information.

Simultaneously or concurrently, ACARS messages are also received and decoded and data such as aircraft registration 26 and flight ID 27, as well as all other ACARS message data is stored in a database and memory. All the aforementioned data available from the Mode S transponder transmission may then be correlated with ACARS message data by matching registration number 23 from the SSR decoder with registration number 26 from the ACARS decoder.

The resultant correlated data, as illustrated in FIG. 2, contains a host of information specifically identifying an aircraft. Such information, when correlated with multilateration data, can provide a complete and accurate picture of aircraft identity and position. Such information may be useful to an airline in tracking individual aircraft for business planning purposes. In addition, such information may be used for ground tracking purposes (e.g., for noise abatement verification). Moreover, such data may be re-transmitted on a data channel to other aircraft to provide a real-time display of aircraft in the vicinity.

Figure 3:
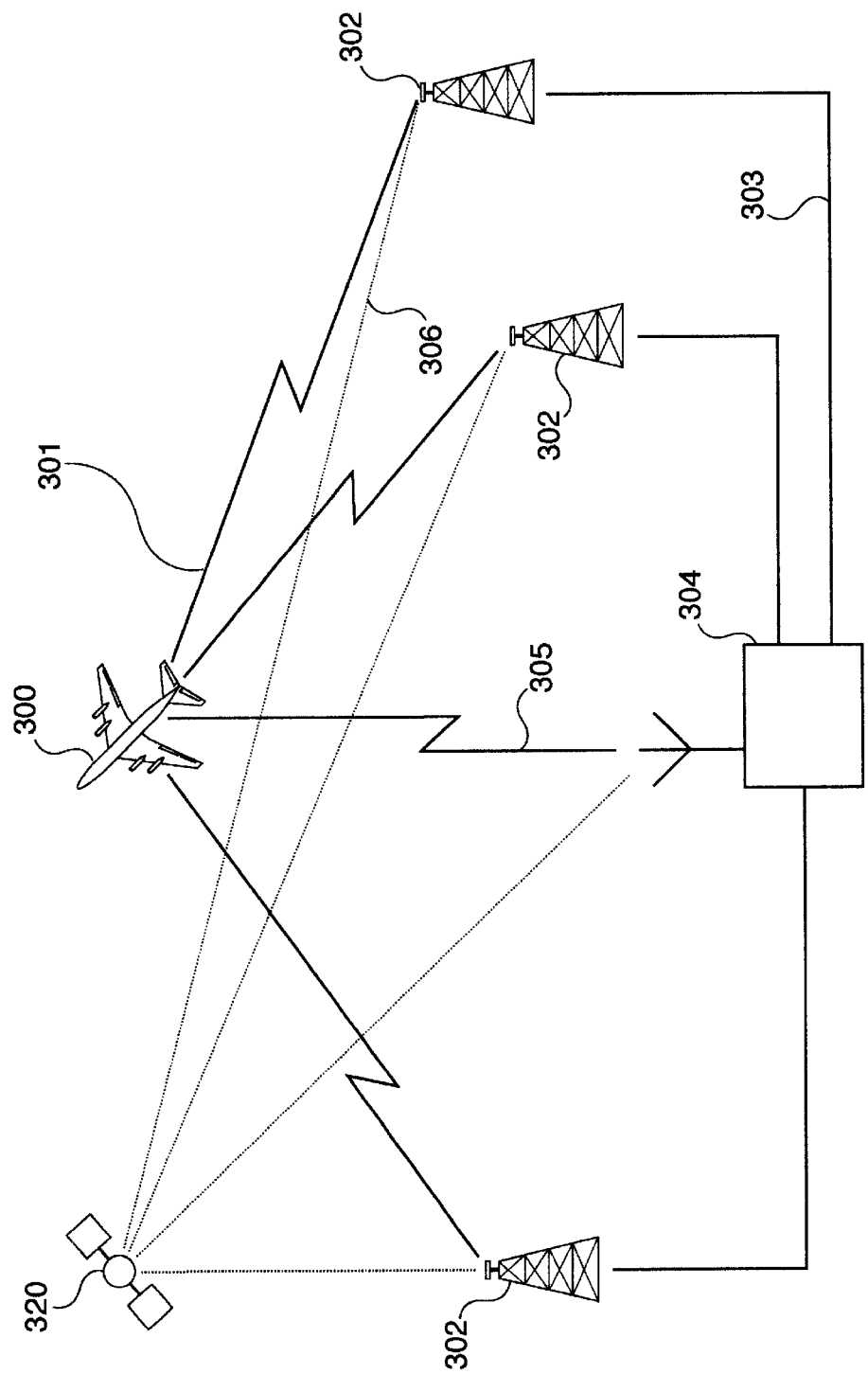
FIG. 3 is a diagram of an aircraft multilateration system that integrates SSR and ACARS data.

Referring to the embodiment depicted in FIG. 3, the integration of ACARS and SSR data is shown with an aircraft multilateration system. Aircraft 300 transmits SSR signals 301 at least once per second. SSR signals 301 may be received at one or more of multiple ground stations 302. The time of arrival at each ground station is determined by reference to a standard time reference provided by GPS signal 306 from GPS satellite 320.

One or more of ground stations 302 may then send time stamped SSR data 303 to central workstation 304. Time stamped SSR data 303 includes the Mode S address of aircraft 300 which is unique to every aircraft and can be correlated to a registration number. At central workstation 304 a processor then calculates the position of the aircraft using difference time of arrival (DTOA) techniques. The aircraft's location and registration number are then known and can be displayed to a user.

Also at the central workstation 304, ACARS data is received and modulated, providing a roster or look-up table between registration number and aircraft assigned flight number. Thus, the entire system provides an independent air traffic control picture complete with aircraft position and identification by flight number, using only passive radio reception techniques.

In a preferred embodiment, an adaptive or learning database of aircraft registration information and related details may be implemented as database 6 of FIG. 1. One difficulty in decoding an aircraft Mode S address is that one may not be able to match every address to a unique aircraft identification number without having either a look-up table or conversion algorithm.

For example, in some instances, an aircraft might be brand new and not in the present database or the look-up table might not be available from a particular country of origin. It should be noted that unidentifiable registrations for these reasons are expected to be the minority of aircraft. However, for reasons such as noise monitoring, it may still be important to identify all or as many aircraft as possible.

Figure 4:
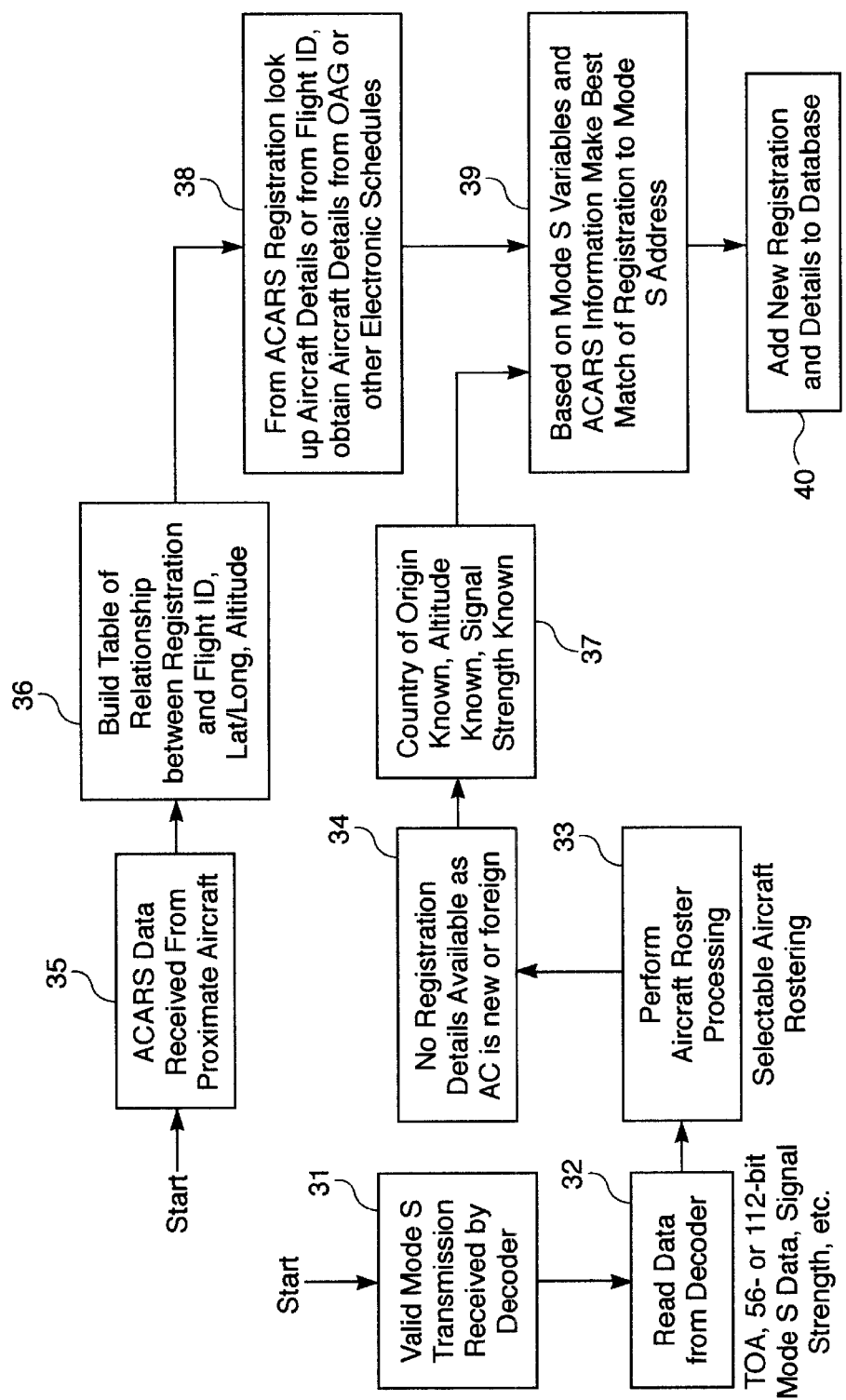
FIG. 4 is a block diagram illustrating the self-learning database system of the preferred embodiment of the present invention.

For this reason it is advantageous to have a database of aircraft Mode S addresses and registrations which may be updated regularly, such as in the preferred embodiment shown in FIG. 4 for a Self-learning database.

Referring to FIG. 4, a Mode S transmission may be received by a decoder in step 31, and is read from the decoder in block 32. A roster or table may be built for the aircraft in general area 33. In the example of FIG. 4, because the aircraft is of foreign registration, no registration look-up is available as illustrated in step 34. However, the country of origin is known as are other details provided by Mode S decoding process 37.

Meanwhile, an ACARS receiver receives and processes ACARS data in step 35 and a table is built in step 36 matching flight number to registration, and other details, based solely upon the ACARS information. Also, details on a particular aircraft may be known from the registration number, by looking up in other commercially available databases, such as the OAG schedule in step 38.

Based on the spatial and other information, a best estimate is made of the match between the aircraft Mode S address and a registration number in step 39. The new registration/mode S look-up is then entered into the database 40 for future use.

Since many foreign aircraft may tend to visit the same airports or airspace more than once, (e.g., routine commercial flights), the data acquired using such a technique may be accessed the next time such an aircraft re-visits the airspace. In addition, the system of the present invention may be networked to other such systems over a wide area to share such "learned" data.

Note that this technique may also be used to validate or correct information that is already in a database. Thus, over a period of time, database data may be corrected or upgraded. Again, such data may be accessed during subsequent visits of an aircraft to an airspace, or may be shared with other systems so as to update a database for an overall network.

While the preferred embodiment and various alternative embodiments of the invention have been disclosed and described in detail herein, it may be apparent to those skilled in the art that various changes in form and detail may be made therein without departing from the spirit and scope thereof.

It should be noted that the present invention has been described in connection with the preferred embodiment. However, as one of ordinary skill in the art may appreciate, elements of the invention may be practiced individually or in various sub-combinations not including all of the elements of the preferred embodiment, and still fall within the spirit and scope of the present invention.

For example, in the preferred embodiment, position and identification information are obtained and displayed in an air traffic display. However, in alternative embodiments, only position or identification information may be obtained and displayed. Thus, for example, identification information may be obtained using the techniques of the present invention for use in identifying aircraft in the vicinity. Position information of such aircraft may not be required, or may be obtained using other techniques, including, but not limited to, conventional radar.

What is claimed is:

1. A method of correlating flight identification data with secondary surveillance radar data, comprising the steps of:

receiving, in a first receiver/decoder, a transponder signal, converting, in the first receiver/decoder, the transponder signal to digital data, extracting, an address from the digital data, storing, in a first roster, the address, extracting, from address in the first roster, an aircraft registration number, performing a database look-up, using the aircraft registration number, to extract aircraft data, receiving, in a second receiver/decoder, an ACARS transmission, storing, in a second roster, flight data, including aircraft registration number, matching flight data to aircraft data using aircraft registration number, and displaying at least a portion of at least one of flight data and aircraft data.

2. The method of claim 1, wherein said step of extracting further comprises:

determining a U.S. aircraft registration number by use of a mathematical algorithm on the digital data.

3. The method of claim 1, wherein said step of extracting further comprises:

determining a foreign aircraft registration number by use of a lookup table.

4. The method of claim 1, wherein the aircraft data includes at least one of aircraft make, model, serial number, owner/operator, owner/operator address, engine type, engine noise class, and engine modifications.

5. The method of claim 1, wherein said ACARS transmission comprises:

an ACARS transmission over VHF frequencies including at least one of 131.550 MHz, 130.025 MHz, 129.125 MHz, 131.725 MHz, 131.450 MHz, 131.550 MHz, and 131.475 MHz, and HF and SATCOM and VDL Mode 1, 2, 3 or 4.

6. The method of claim 1, wherein the flight information includes at least one of aircraft registration number, flight ID number, Out reports, Off reports, On reports and In reports, cockpit message reports, fuel reports, peripheral message reports and miscellaneous message reports.

7. The method of claim 1, wherein the transponder signal is a Mode S transponder signal and the address is a Mode S address.

8. A method of learning aircraft data through correlation of flight identification data with secondary surveillance radar data, comprising the steps of:

receiving, in a first receiver/decoder, a transponder signal, converting, in the first receiver/decoder, the transponder signal to digital data, extracting, an address from the digital data, storing, in a first roster, the address, extracting, from address in the roster, aircraft information data including country or origin, receiving, in a second receiver/decoder, an ACARS transmission, storing, in a second roster, flight data, including aircraft registration number, making a best guess match between aircraft information data to aircraft registration number using flight data.

9. The method of claim 8, further comprising the step of updating the first roster with aircraft registration number.

10. The method of claim 9, further comprising the steps of:

retrieving, from a database, aircraft information based upon registration number, and updating the second roster with aircraft information and registration number.

11. The method of claim 9, further comprising the step of displaying at least a portion of at least one of flight data and aircraft data.

* * * * *